H. M. BREWSTER.
LOCKING DEVICE.
APPLICATION FILED SEPT. 16, 1915.
1,185,285. Patented May 30, 1916.
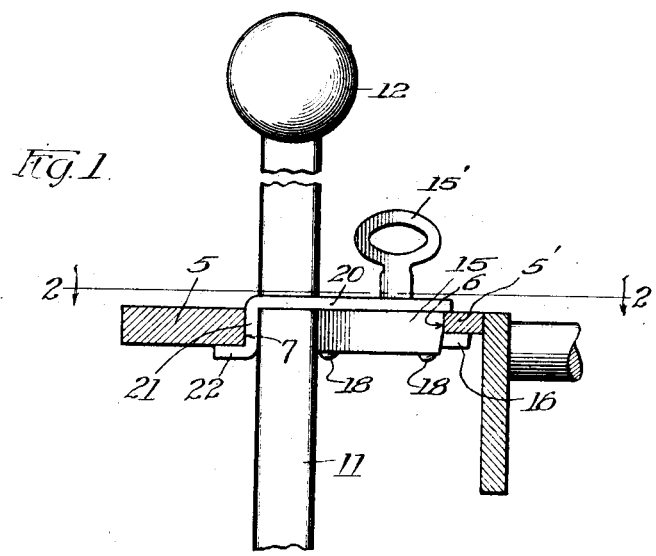
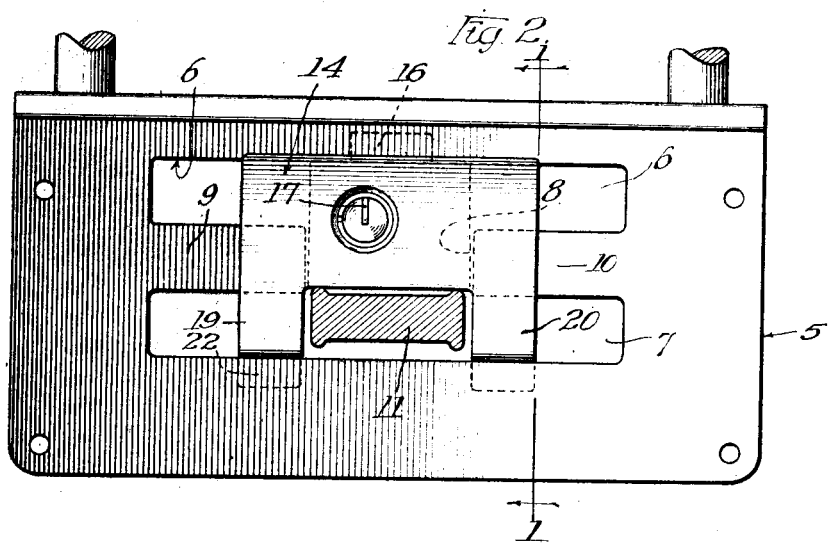
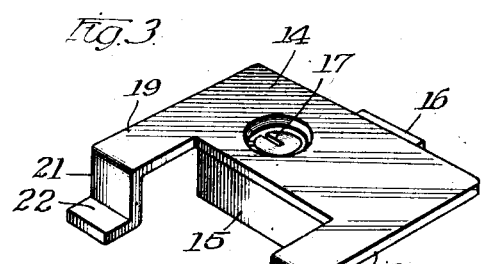
Witnesses:
Inventor
Herbert M. Brewster

UNITED STATES PATENT OFFICE.

HERBERT M. BREWSTER, OF CHICAGO, ILLINOIS.

LOCKING DEVICE.

1,185,285.  Specification of Letters Patent.  Patented May 30, 1916.

Application filed September 16, 1915. Serial No. 50,939.

*To all whom it may concern:*

Be it known that I, HERBERT M. BREWSTER, a subject of the King of Great Britain, residing at Chicago, in the county of Cook and State of Illinois, have invented certain new and useful Improvements in Locking Devices, of which the following is a specification.

My invention relates to improvements in locking devices.

One of the objects of my invention is to provide a lock and accompanying parts secured thereto, whereby they jointly constitute a stop to prohibit the movements of an otherwise unrestrained part or parts, such as a lever or the like, when the structure is secured by its lock within the path of said lever.

A particular object of my invention is to provide a removable lock and attached part, adapted to be placed and held by the lock in the path of the speed changing lever of an automobile, and which will hold the lever in place to maintain the speed changing gear in neutral position, with the engine disconnected from the running gear of the vehicle.

Other and further objects of my invention will become readily apparent to persons skilled in the art, from a consideration of the following description when taken in conjunction with the drawings, wherein:—

Figure 1 is a transverse section of a speed changing lever plate showing the lever in elevation and the locking device locked to said plate. Fig. 2 is a section taken on line 2—2 of Fig. 1. Fig. 3 is a perspective view of the locking device.

In all the views the same reference character are employed to indicate similar parts.

5 is the usual slotted plate for the speed changing lever of an automobile, providing two parallel slots 6 and 7 and a transverse slot 8 joining the said parallel slots. Between the slots 6 and 7 and extending to the transverse slot 8 are confronting projections 9 and 10. The lever 11 is provided with a handle 12 and is adapted to pass through and cross the slots 6 and 7 from end to end and to cross from one slot to the other through the transverse slot 8, as usual in such structures, for the purpose of operating the speed changing mechanism, of the usual transmission gear of an automobile. When the locking device 14 is not in position, shown in Figs. 1 and 2, the lever 11 is adapted to be moved freely within the slots described.

The lock 15, provided with a bolt 16, and key hole 17 is secured to the part 14, by the rivets 18 or in any other suitable manner.

The plate 14 is provided with laterally extended arms 19 and 20, of any desired width, which are preferably downturned, as at 21, and out-turned, as at 22.

To place the lock structure in position on the plate 5, to prevent effective movement of the lever 11, and to hold it in neutral position, it is only necessary to insert the downturned portions 22 under the edge of the plate bounding the slot 7 on one side, and to place the lock 15 in the transversely extending connecting slot 8 and to then turn the bolt 16 outwardly, by the key 15', under the part 5' of the plate. Then the locking device cannot be removed without unlocking it, and the lever cannot be moved out of its central position in the slot 7 in which it is placed at the time when the locking device is put in position. The lever cannot effectively be moved toward either end of the slot 7 on account of the arms 19 and 20 nor can it be moved into the intermediate slot 8 because of the fact that the lock 15 serves as a stop to prevent such movement. The width of the arms 19 and 20 may extend to the full length of the slot 7, if desired. When it is desired to release the lever 11 so that it may be freely used, to perform its usual functions, it is only necessary to turn the bolt 16 back into the lock, by means of a key 15', when the locking device may be bodily removed from its position in the slots 6, 7 and 8 of the plate 5. The locking device may then be placed in a convenient receptacle ready to be used again to lock the speed changing lever in neutral position.

While I have herein shown a single embodiment of my invention for the purpose of clear disclosure, it is manifest that the structure has many other uses than described and that changes may be made in the configuration, size and relation of the parts, within the scope of the appended claim.

Having described my invention, what I claim is:

A locking device adapted to restrain a lever passing through an H slot in a plate, and hold the same in a neutral position, comprising a body part having projecting arms to extend each side of the lever, downturned fingers on the ends of the arms arranged to engage the under side of the slotted plate at an edge of the slot, a lock mechanism carried on the under side of the body part and arranged to extend into the cross connecting portion of the H slot, and a bolt operated by the lock mechanism and slidable under the edge of the slotted plate at the edge opposite to that engaged by the aforesaid finger.

In testimony whereof I hereunto set my hand in the presence of two subscribing witnesses.

HERBERT M. BRE

In the presence of—
 FORÉE BAIN,
 MARY F. ALLEN.